Dec. 27, 1927.

H. P. KRAFT

VALVE CAP

Filed April 3, 1920

1,654,178

WITNESS:
Rene Bluine

INVENTOR:
Henry P. Kraft
By Attorneys,
Fraser Fink & Mills

Patented Dec. 27, 1927.

1,654,178

UNITED STATES PATENT OFFICE.

HENRY P. KRAFT, OF RIDGEWOOD, NEW JERSEY; EDGAR J. PHILLIPS AND EARL A. DARR EXECUTORS OF HENRY P. KRAFT, DECEASED.

VALVE CAP.

Application filed April 3, 1920. Serial No. 370,995.

This invention relates to caps for tire valves or the like, and aims to provide certain improvements therein.

The present invention relates to a form of valve cap for pneumatic tire valves, which may be made of smaller diameter than those now in use. As heretofore constructed, a dome-shaped packing washer has been used, which dome-shaped washer has had embedded within it a dome-shaped stiffening member intended to prevent internal collapsing of the washer. The washer has usually rested against a cup of metal which has been interposed between the upper part of the cap and the washer. In such constructions there has been no mechanical connection between the metal cup and the washer, but the edges of both have extended into a circular recess formed by expanding the cap immediately above the screw threads. I have found that if the metal cup lying above the washer is decreased in diameter and is vulcanized or otherwise fixed to the washer, the depth of such annular recess may be decreased, with the result that the over-all diameter of the cap may also be decreased.

In the drawing, wherein I have shown one form of the invention—

Figure 1:
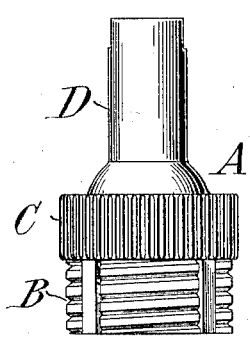
Figure 1 is an elevation of the cap.

Referring to the drawing, let A indicate the cap as a whole. This is shown as being formed of one piece of sheet-metal drawn to proper form, and having a screw threaded portion B the threads of which are rolled or otherwise formed in the metal, a middle portion C, and a screw-driver projection D. The latter is provided with the usual slot E for engaging the valve insides.

The middle portion C is of larger diameter than the screw threaded portion B, this part of the structure being expanded outwardly to provide on the interior an annular groove F. It is also knurled on its exterior to make a convenient finger-hold for the user in screwing and unscrewing it.

Within the cap is located a packing washer G, the lower face H of which is designed to contact with the top of the nipple of the tire valve. The washer is dome-shaped, being formed on its lower side with a deep recess I which in practice is designed to receive the projecting pin of the valve, by means of which the valve check may be pressed inwardly to open the valve. It is of great importance that this central recess I shall be kept open, as otherwise, when the cap is screwed on the valve, the pin will be depressed and the valve held in open position. To avoid collapse of the packing washer in use, it has heretofore been proposed to provide a dome-shaped metallic member J which is partly embedded in the packing washer and serves to prevent inward collapse of the latter.

Above the packing washer G is a non-compressible cup-shaped member K which serves as an anti-friction device when the cap is screwed down or up, the cup K causing the packing to swivel in the body portion of the cap. Heretofore such cup members have been formed separately from the packing washer and usually have been continued outwardly to the full diameter of the annular recess F, and downwardly to receive the packing washer. The packing washer has not been connected in any way with the cup K, but, on the contrary, has been separately formed and separately introduced into the cap, and after introduction has been expanded, so that its edges lie within the annular recess. The increase in diameter of the cup prevents it initially from dropping out of the cap. The packing washer has then been introduced into the recess, its diameter being sufficient to require contraction to pass it through the threaded portion. When it reaches the recess it expands into the latter, whereby it is held in place. It has heretofore been thought necessary to make the cup so that when expanded it would cover the entire upper face of the washer, and in many cases it has been provided with a depending flange to embrace the outer edge of the washer.

I have found that if the cup is vulcanized or otherwise fixed to the top of the washer, its diameter may be reduced, with the result that the annular recess may also be reduced in depth, and consequently the over-all diameter of the cap may be decreased. This is a very desirable feature in connection with certain dust caps which are required to be passed over the valve cap during the act of applying them to the tire valve.

Figure 2:
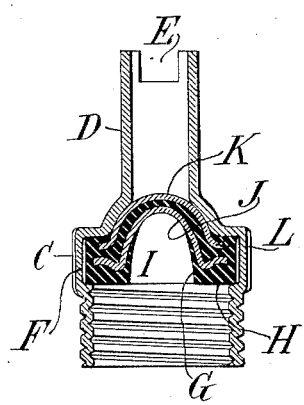
Fig. 2 is a diametrical section.
Figure 4:
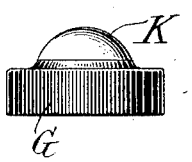
Fig. 4 is an elevation of the washer separately.
Figure 3:
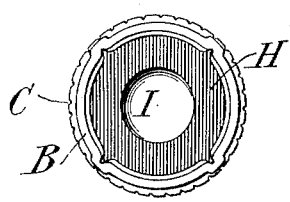
Fig. 3 is an underside view of Fig. 2.

Preferably the lower edges L of the cup are embedded in the packing washer, as shown in Fig. 2. With the construction described, an adequate swivelling function is obtained even though the cup does not cover the entire upper surface of the washer.

While I have shown and described one form of the invention, it will be understood that I do not wish to be limited thereto, since various changes may be made therein without departing from the spirit of the invention.

What I claim is:—

A valve cap or the like having a packing washer provided with a central recess in its bottom face, a dome-shaped stiffening member embedded in said packing washer above said recess, a non-compressible member fixed to the top face of the washer and acting as an anti-friction device, the diameter of the stiffening member and of the non-compressible member being less than that of the packing washer and the stiffening member, non-compressible member and packing washer being inserted into the cap as a unit and held therein solely by the elasticity of the packing washer.

In witness whereof, I have hereunto signed my name.

HENRY P. KRAFT.